(12) United States Patent
Chang et al.

(10) Patent No.: US 6,777,066 B1
(45) Date of Patent: Aug. 17, 2004

(54) PERPENDICULAR MAGNETIC RECORDING MEDIA WITH IMPROVED INTERLAYER

(75) Inventors: Chung-Hee Chang, Fremont, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 09/986,063

(22) Filed: Nov. 7, 2001

Related U.S. Application Data

(60) Provisional application No. 60/274,098, filed on Mar. 7, 2001.

(51) Int. Cl.⁷ ............................................. G11B 5/667
(52) U.S. Cl. ............ 428/216; 428/694 T; 428/694 TM; 428/694 TS
(58) Field of Search ............................... 428/65.3, 65.4, 428/65.5, 65.7, 694 R, 694 SC, 694 MM, 694 EC, 694 T, 694 TP, 694 TF, 694 TM, 694 BP, 694 BF, 694 BN, 694 BA, 694 ST, 695, 216, 694 TS

(56) References Cited

U.S. PATENT DOCUMENTS

| | | | | |
|---|---|---|---|---|
| 5,589,262 A | * | 12/1996 | Kiuchi et al. | 428/694 TM |
| 5,851,643 A | * | 12/1998 | Honda et al. | 428/694 TM |
| 6,183,893 B1 | | 2/2001 | Futamoto et al. | |
| 6,383,598 B1 | * | 5/2002 | Fullerton et al. | 428/694 T |
| 6,447,936 B1 | * | 9/2002 | Futamoto et al. | 428/694 TM |
| 6,468,670 B1 | * | 10/2002 | Ikeda et al. | 428/694 TM |

OTHER PUBLICATIONS

Lee et al., "Some unique magnetic properties of thin CoCrPt/Ti perpendicular media and their application in recording", Digest of PMRC 2000, Oct. 23–26, 2000, pp. 147–148.

* cited by examiner

*Primary Examiner*—Stevan A. Resan
(74) *Attorney, Agent, or Firm*—McDermott Will & Emery LLP

(57) ABSTRACT

A low noise, high areal recording density, perpendicular magnetic recording medium comprises:
 (a) a non-magnetic substrate having a surface; and
 (b) a layer stack formed over the substrate surface, the layer stack comprising, in overlying sequence from the substrate surface:
  (i) a magnetically soft underlayer;
  (ii) at least one non-magnetic interlayer; and
  (iii) a CoCr-based, magnetically hard perpendicular recording layer;
 wherein the compositions of the at least one non-magnetic interlayer and the CoCr-based, magnetically hard perpendicular recording layer are selected to provide the medium with a negative nucleation field $H_n$, remanent squareness of about 1, and high coercivity of at least about 5,000 Oe.

A method for manufacturing the medium by means of DC magnetron sputtering of layers (i)–(iii) is also disclosed.

17 Claims, 2 Drawing Sheets

US 6,777,066 B1

PERPENDICULAR MAGNETIC RECORDING MEDIA WITH IMPROVED INTERLAYER

CROSS-REFERENCE TO PROVISIONAL APPLICATION

This application claims priority from U.S. provisional patent application Serial No. 60/274,098 filed Mar. 7, 2001, the entire disclosure of which is incorporated herein by reference.

FIELD OF THE INVENTION

The present invention relates to improved perpendicular magnetic recording media with improved signal-to-medium noise ratio ("SMNR"), for use with single-pole transducer heads. The present invention is of particular utility in the manufacture of data/information storage and retrieval media, e.g., hard disks, exhibiting ultra-high areal recording densities of about 200 Gb/in$^2$ and greater with ultra-low noise characteristics.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer ("SUL"), i.e., a magnetic layer having relatively low coercivity, such as of a NiFe alloy (Permalloy), between the non-magnetic substrate, e.g., of glass, aluminum (Al) or an Al-based alloy, and the "hard" magnetic recording layer, e.g., of a cobalt-based alloy (e.g., a Co—Cr alloy) having perpendicular anisotropy or of a (CoX/Pd or Pt)$_n$ multi-layer superlattice structure. The magnetically soft underlayer serves to guide magnetic flux emanating from the head through the magnetically hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate the substrate, soft magnetic underlayer, at least one non-magnetic interlayer, and vertically oriented, hard magnetic recording layer of perpendicular magnetic medium 1, and reference numerals 7 and 8, respectively, indicate the single and auxiliary poles of single-pole magnetic transducer head 6. Relatively thin interlayer 4 (also referred to as an "intermediate" layer), comprised of one or more layers of non-magnetic materials, is provided in a thickness sufficient to prevent (i.e., de-couple) magnetic interaction between the soft underlayer 3 and the hard recording layer 5 but should be as thin as possible in order to minimize the spacing (HSS in the figure) between the lower edge of the transducer head 6 and the upper edge of the magnetically soft underlayer 3. In addition, interlayer 4 serves to promote desired microstructural and magnetic properties of the hard recording layer 5. As shown by the arrows in the figure indicating the path of the magnetic flux φ, flux φ is seen as emanating from single pole 7 of single-pole magnetic transducer head 6, entering and passing through vertically oriented, hard magnetic recording layer 5 in the region above single pole 7, entering and travelling along soft magnetic underlayer 3 for a distance, and then exiting therefrom and passing through vertically oriented, hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) layer formed over hard magnetic layer 5, and a lubricant topcoat layer, such as a layer of a perfluoropolyethylene material, formed over the protective overcoat layer. Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; soft magnetic underlayer 3 is typically comprised of an about 2,000 to about 4,000 Å thick layer (or a pair of layers) of a soft magnetic material selected from the group consisting of Ni, NiFe (Permalloy), Co, CoZr, CoZrCr, CoZrNb, CoFe, Fe, FeN, FeSiAl, FeSiAlN, etc.; interlayer 4 typically comprises an up to about 10 Å thick layer (or layers) of at least one non-magnetic material, such as Pt, Pd, Ir, Re, Ru, Hf, alloys thereof, TiCr, and Co-based alloys; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as Fe$_3$O$_4$ and δ-Fe$_2$O$_3$, or a (CoX/Pd or Pt)$_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 10 Å thick. Each type of hard magnetic recording layer material has perpendicular anisotropy arising from magneto-crystalline anisotropy (1$^{st}$ type) and/or interfacial anisotropy (2$^{nd}$ type).

Another way of classifying perpendicular magnetic recording media into different types is based on the media properties provided by the material utilized for the magnetically hard recording layer. For example, as indicated above, the magnetically hard, perpendicular recording layer can comprise magnetic alloys which are typically employed in longitudinal media, e.g., CoCr alloys, or multilayer magnetic superlattice structures, such as the aforementioned (CoX/Pd or Pt)$_n$ superlattice structures. Representative M-H hysteresis loops of magnetic recording layers comprised of these different types of materials are shown in FIGS. 2(A)–2(B). As is evident from FIG. 2(A) showing the M-H loop of a perpendicular recording medium comprising a CoCr alloy, such type media typically exhibit a relatively low coercivity, low remanent squareness, i.e., less than 1, and a positive nucleation field $H_n$. In addition, the occurrence of magnetic domain reversal within bits, caused by the presence of high demagnetization fields in CoCr-based perpendicular recording media, is problematic with such media in that the phenomenon is a significant source of media noise reducing the SMNR. A high remanent squareness and a negative nucleation field $H_n$ are required in order to obtain good bit stability.

By contrast, and as evidenced by FIG. 2(B) showing the M-H loop of a perpendicular recording medium comprising a $(CoX/Pd)_n$ multilayer magnetic superlattice structure, such type media advantageously exhibit a relatively high coercivity, remanent squareness of about 1, and a negative nucleation field $H_n$, which characteristics are attributed to the high anisotropy energy of such type media arising from interfacial anisotropy effects. However, the grains of the multilayer magnetic superlattice structure tend to experience exchange coupling leading to transition noise. Moreover, notwithstanding the possibility of further improvements in multilayer magnetic superlattice structures for use in the fabrication of high recording density magnetic media, significant current issues/problems remain pertaining to the ability to manufacture such structures in a commercially viable manner.

It is believed that high areal recording densities of about 200 Gbit/in$^2$ or greater are possible with perpendicular magnetic media utilizing CoCr-based magnetic alloys as the magnetically hard recording layer. However, the obtainment of such high areal recording densities requires CoCr-based perpendicular media which exhibit the advantageous properties associated with multilayer magnetic superlattice-based media, i.e., high coercivity, remanent squareness of about 1, and a negative nucleation field $H_n$.

In view of the above, there exists a clear need for improved, high areal recording density, perpendicular magnetic information/data recording, storage, and retrieval media including CoCr-based magnetically hard recording layers, but which exhibit substantially increased signal-to-media noise ratios (SMNR), high coercivity, remanent squareness of about 1, and a negative nucleation field $H_n$. In addition, there exists a need for an improved method for manufacturing high areal recording density, perpendicular magnetic recording media employing CoCr-based magnetically hard recording layers which exhibit substantially increased SMNR, high coercivity, remanent squareness of about 1, and a negative nucleation field $H_n$, which media can be readily and economically fabricated by means of conventional manufacturing techniques and instrumentalities.

The present invention addresses and solves problems attendant upon the use of CoCr-based magnetically hard recording layers in the manufacture of high bit density perpendicular magnetic media, e.g., noise generation which adversely affects the SMNR of the media, while maintaining all structural and mechanical aspects of high bit density recording technology. Moreover, the magnetic media of the present invention can be fabricated by means of conventional manufacturing techniques, e.g., sputtering.

DISCLOSURE OF THE INVENTION

An advantage of the present invention is an improved low noise, high areal recording density, perpendicular magnetic recording medium.

Another advantage of the present invention is an improved, low noise, high areal recording density, perpendicular magnetic recording medium having a negative nucleation field $H_n$, remanent squareness of about 1, and high coercivity of at least about 5,000 Oe.

Still another advantage of the present invention is a method of manufacturing an improved low noise, high areal recording density, perpendicular magnetic recording medium.

Yet another advantage of the present invention is a method of manufacturing an improved low noise, high areal recording density, perpendicular magnetic recording medium having a negative nucleation field $H_n$, remanent squareness of about 1, and high coercivity of at least about 5,000 Oe.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a low noise, high areal recording density, perpendicular magnetic recording medium, comprising:

(a) a non-magnetic substrate having a surface; and (b) a layer stack formed over the substrate surface, the layer stack comprising, in overlying sequence from the substrate surface:

(i) a magnetically soft underlayer;

(ii) at least one non-magnetic interlayer; and (iii) a CoCr-based, magnetically hard perpendicular recording layer;

wherein the compositions of the at least one non-magnetic interlayer and the CoCr-based, magnetically hard perpendicular recording layer are selected to provide the medium with a negative nucleation field $H_n$, remanent squareness of about 1, and high coercivity of at least about 5,000 Oe.

In accordance with embodiments of the present invention, the at least one non-magnetic interlayer (ii) is not more than about 10 nm thick and comprises a layer of Ru, a Ru/CoCr bi-layer structure, or a Ru/CoCrX bi-layer structure, wherein X is at least one element selected from the group consisting of Pt, Ta, Mo, Ti, W, Ag, and Pd.

According to particular embodiments of the present invention, the at least one non-magnetic interlayer (ii) comprises a Ru/CoCr bi-layer structure, wherein the Cr content of the CoCr portion of the Ru/CoCr bi-layer structure is from about 37 to about 43 at. %, or a Ru/CoCrX bi-layer structure, wherein the Co content of the CoCrX portion of the Ru/CoCrX bi-layer structure is from about 57 to about 63 at. %.

According to further embodiments of the present invention, the CoCr-based, magnetically hard perpendicular recording layer (iii) is from about 10 to about 30 nm thick and comprises a CoCrPt alloy, e.g., with a Pt content from about 14 to about 21 at. %, such as a CoCrPt alloy comprising about 20 at. % Cr and about 15 at. % Pt; the magnetically soft underlayer (i) is from about 150 to 400 nm thick and comprises a material selected from the group consisting of: Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, and FeCoB, e.g., FeCoB; and the non-magnetic substrate (a) comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof.

According to still other embodiments of the present invention, the magnetic recording medium further comprises:

(c) a protective overcoat layer over the magnetically hard perpendicular recording layer (iii); and (d) a lubricant topcoat over the protective overcoat layer.

According to embodiments of the present invention, the non-magnetic substrate (a) comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof; and the layer stack (b) comprises:
- a magnetically soft underlayer (i) from about 150 to 400 nm thick and comprised of FeCoB;
- a non-magnetic interlayer (ii) not greater than about 10 Å thick, comprised of a Ru layer, a Ru/CoCr bi-layer structure, or a Ru/CoCrX bi-layer structure, wherein X is at least one element selected from the group consisting of Pt, Ta, Mo, Ti, W, Ag, and Pd; and
- a magnetically hard, perpendicular magnetic recording layer (iii) about 25 nm thick and comprised of a CoCrPt alloy with about 20 at. % Cr and about 15 at. % Pt;
- and the medium exhibits a high coercivity of about 5,000 Oe, a remanent squareness of about 0.98, and a negative nucleation field $H_n$ of at least about −1,250 Oe.

Another aspect of the present invention is a method of manufacturing a low noise, high areal recording density, perpendicular magnetic recording medium, comprising the steps of:

(a) providing a non-magnetic substrate having a surface; and (b) forming a layer stack over the substrate surface, comprising steps for forming in overlying sequence from the substrate surface:
  (i) a magnetically soft underlayer;
  (ii) at least one non-magnetic interlayer; and
  (iii) a CoCr-based, magnetically hard perpendicular recording layer;

wherein step (b) includes selecting the compositions of the at least one non-magnetic interlayer and the CoCr-based, magnetically hard perpendicular recording layer to provide the medium with a negative nucleation field $H_n$, remanent squareness of about 1, and high coercivity of at least about 5,000 Oe.

According to embodiments of the present invention, step (a) comprises providing a non-magnetic substrate comprised of a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof;

step (b)(i) comprises forming the magnetically soft underlayer as an about 150 to about 400 nm thick layer comprised of a material selected from the group consisting of: Ni, NiFe (Permalloy), Co, CoZr, CoZrCr, CoZrNb, CoTaZr, CoFe, Fe, FeN, FeSiAl, FeSiAlN, FeTaC, FeAlN, CoFeZr, and FeCoB;

step (b)(ii) comprises forming the at least one non-magnetic interlayer at a thickness not greater than about 10 nm and comprised of a layer of Ru, a Ru/CoCr bi-layer structure, or a Ru/CoCrX bi-layer structure, wherein X is at least one element selected from the group consisting of Pt, Ta, Mo, Ti, W, Ag, and Pd; and step (b)(iii) comprises forming the CoCr-based, magnetically hard perpendicular recording layer as an about 10 to about 30 nm thick layer comprised of a CoCrPt alloy with a Pt content from about 14 to about 21 at. %.

In accordance with a particular embodiment of the present invention:

step (b)(i) comprises forming a magnetically soft underlayer comprised of FeCoB;

step (b)(ii) comprises forming a non-magnetic interlayer wherein the portion of Co in the Ru/CoCr bi-layer structure or Ru/CoCrX bi-layer structure is from about 57 to about 63 at. %.

step (b)(iii) comprises forming a magnetically hard, perpendicular magnetic recording layer (iii) about 25 nm thick and comprised of a CoCrPt alloy with about 20 at. % Cr and about 15 at. % Pt;

whereby the medium exhibits a high coercivity of about 5,000 Oe, a remanent squareness of about 0.98, and a negative nucleation field $H_n$ of at least about −1,250 Oe.

According to an embodiment of the present invention, each of steps (b)(i), (b)(ii), and (b)(iii) for respectively forming the magnetically soft underlayer, the non-magnetic interlayer, and the magnetically hard, perpendicular recording layer comprises DC magnetron sputtering; and the method further comprises heating the non-magnetic substrate between steps (b)(i) and (b)(ii) and between steps (b)(ii) and (b)(iii).

Further embodiments of the present invention comprise steps of:

(c) forming a protective overcoat layer over the magnetically hard perpendicular recording layer; and (d) forming a lubricant topcoat over the protective overcoat layer.

Still another aspect of the present invention is a low noise, high areal recording density, perpendicular magnetic recording medium, comprising:

(a) a perpendicular magnetic recording layer comprised of a CoCr alloy; and (b) means for providing the medium with a high negative nucleation field $H_n$, remanent squareness of about 1, and a high coercivity of at least about 5,000 Oe.

A still further aspect of the present invention is a disk drive comprising a magnetic recording medium including a layer structure according to the present invention.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the same reference numerals are employed throughout for designating similar features, and the various features are not necessarily drawn to scale but rather are drawn as to best illustrate the pertinent features, wherein.

DESCRIPTION OF THE INVENTION

The present invention addresses and solves problems arising from noise generation in perpendicular magnetic recording media which utilize magnetic alloys as the material of the recording layer, e.g., CoCr-based alloys, which noise generation adversely affects the SMNR of such media. Specifically, the present invention is based upon the discovery that the performance characteristics/properties of such magnetic alloy-based perpendicular recording media, e.g., SMNR, coercivity, squareness, etc., may be improved to values approximating those attainable with perpendicular recording media based on multilayer magnetic superlattice structures, i.e., high coercivity of at least about 5,000 Oe, remanent squareness approaching unity, and high negative nucleation field $H_n$ of at least about −1,250 Oe, by appropriate selection of the alloy composition of the magnetic recording layer and the structure/composition of the non-magnetic interlayer intermediate the magnetic recording layer and the magnetically soft underlayer. A key feature, therefore, of the present invention, is the selection of particular magnetic alloy compositions and non-magnetic interlayer structures for providing magnetic alloy-based perpendicular recording media with desirable characteristics similar to those of multilayer magnetic superlattice-based perpendicular recording media, while avoiding the difficulties associated with manufacture of the latter type media.

Figure 1:
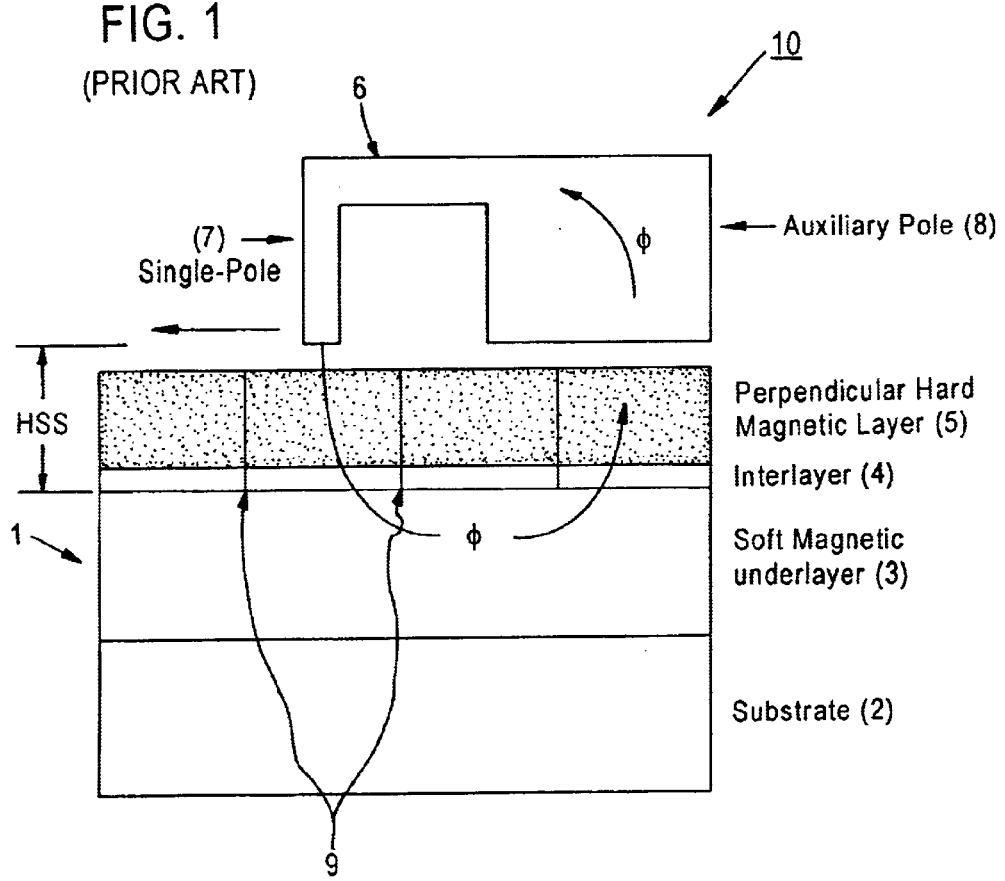
FIG. 1 schematically illustrates, in simplified, cross-sectional view, a portion of a magnetic recording, storage, and retrieval system comprised of a conventional perpendicular-type magnetic recording medium including a soft magnetic underlayer and a single-pole transducer head.
Figure 2A:
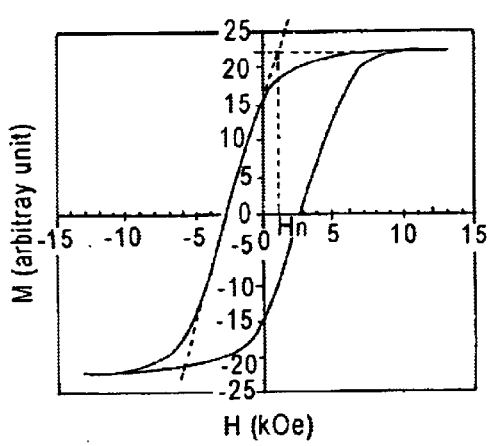
FIGS. 2(A) and 2(B) are representative M-H hysteresis loops obtained for perpendicular magnetic recording media respectively comprised of a CoCr alloy and a $(CoX/Pd)_n$ multilayer superlattice.
Figure 2B:
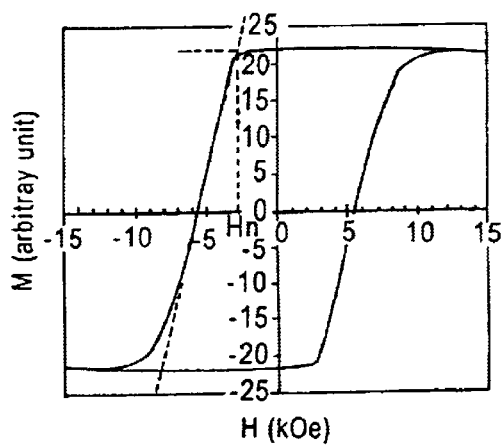
Figure 3:
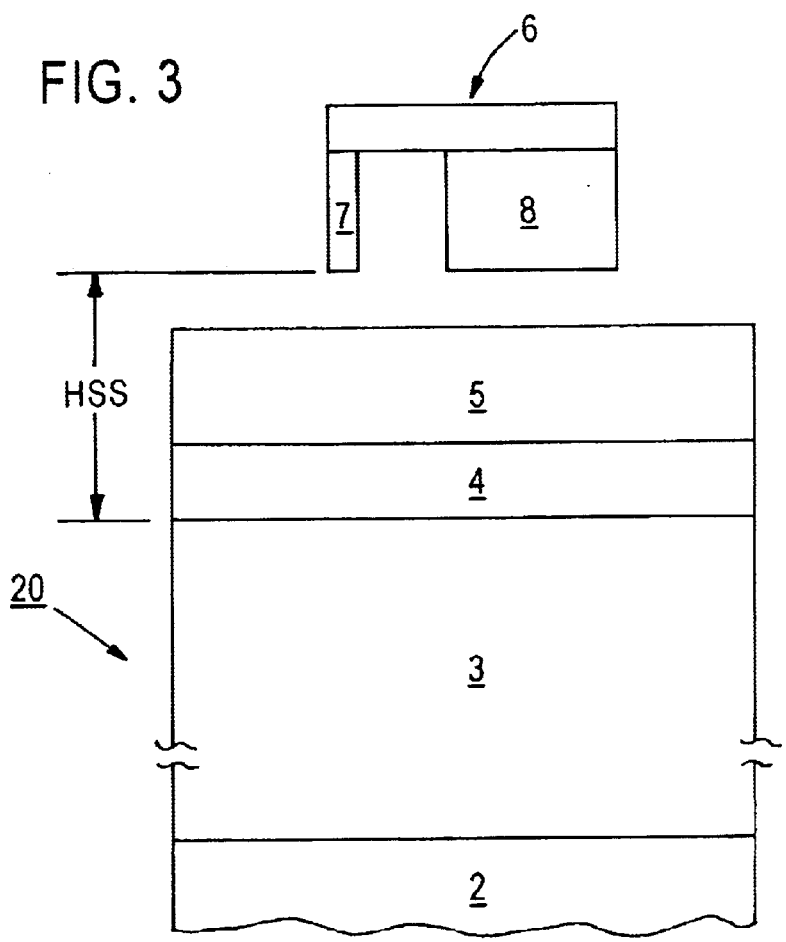
FIG. 3 schematically illustrates, in simplified, cross-sectional view, a portion of a magnetic recording, storage, and retrieval system comprised of a magnetic alloy-based perpendicular-type magnetic recording medium according to the present invention.

Referring now to FIG. 3, schematically illustrated therein, in simplified perspective view, is a portion of a perpendicular magnetic recording medium 20 fabricated according to the principles of the invention. More specifically, perpendicular magnetic recording medium 20 resembles the conventional perpendicular magnetic recording medium of FIG. 1 and comprises a series of layers arranged in an overlying sequence on a suitable non-magnetic substrate 2, i.e., including (1) a soft magnetic underlayer 3; (2) a non-magnetic interlayer 4 according to the present invention, i.e., not greater than about 10 Å thick and comprised of a single layer or a bi-layer structure; and (3) a perpendicularly oriented, hard magnetic recording layer 5 comprised of a magnetic alloy.

In accordance with embodiments of the present invention, the non-magnetic substrate 2 is sufficiently thick as to provide the medium with a desired rigidity and comprises a material selected from the group consisting of: Al, Ni—P-plated Al, Al—Mg alloys, other Al-based alloys, other non-magnetic metals, other non-magnetic alloys, glass, ceramics, polymers, glass-ceramics, and composites and/or laminates thereof.

Overlying the substrate 2 is a soft magnetic underlayer 3 from about 150 to 400 nm thick, comprised of at least one material selected from the group consisting of: Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, and FeCoB. By way of illustration only, soft magnetic underlayer 3 may comprise an about 200 nm thick layer of FeCoB.

Non-magnetic interlayer 4 is interposed between the soft magnetic interlayer and the magnetically hard perpendicular recording layer 5 for preventing magnetic interaction (i.e., de-coupling) between the magnetically soft underlayer 3 and the magnetically hard perpendicular recording layer 5. Non-magnetic interlayer 4 may be present in the form of a single layer or as a bi-layer structure comprised of a pair of vertically superposed or stacked sub-layers. In either instance, the thickness of the interlayer 4 does not exceed about 10 nm. By way of illustration, but not limitation, the non-magnetic interlayer 4 may comprise a single layer of Ru or a bi-layer structure comprised of a first, or lower, layer of Ru and a second, or upper, layer of CoCr or CoCrX, wherein X is at least one element selected from the group consisting of Pt, Ta, Mo, Ti, W, Ag, and Pd.

When a single layer of Ru is utilized as the non-magnetic interlayer 4, the thickness thereof should be in the range from about 4 to about 8 nm. When one of the aforementioned bi-layer structures is utilized as the non-magnetic interlayer 4, the Ru thickness thereof is in the range from about 2 to about 7 nm and the corresponding CoCr or CoCrX thickness thereof is in the range from about 8 to about 3 nm, whereby the overall thickness of interlayer 4 does not exceed about 10 nm. The amount of Cr or Cr+X in the CoCr or CoCrX sub-layers of the bi-layer structures typically is in the range from about 37 to about 43 at. %; the amount of X in the sub-layers can vary from 0 (as in CoCr sub-layers) to about 6 at. % (as in CoCrX sub-layers), where X is at least one element selected from the group consisting of Pt, Ta, Mo, Ti, W, Ag, and Pd; and the amount of Co in the Co in the CoCr or CoCrX sub-layers is in the range from about 57 to about 63 at. %. $CoCr_{37}$, $CoCr_{40}$, $CoCr_{43}$, $CoCr_{37}Pt_5$, and $CoCr_{37}Pt_6$ are illustrative of alloys usable for forming bi-layer structures according to the invention.

According to embodiments of the invention, the magnetic alloy-based, perpendicularly anisotropic, hard magnetic recording layer 5 comprises an about 10 to about 30 nm thick layer of a Co-based ferromagnetic material selected from the group consisting of Co alloyed with one or more elements selected from Cr, Fe, Ta, Ni, Mo, Pt, V, Nb, Ge, and B, with CoCr-based magnetic alloys being particularly useful in practice of the present invention. By way of illustration, CoCr-based magnetic alloys useful according to the present invention may be selected from among CoCrPt alloys, wherein the Pt content is from about 14 to about 21 at. %, e.g., about 15 at. %, and the Cr content is about 20 at. %.

Medium 20 typically further comprises a protective overcoat layer on the uppermost surface of the hard magnetic recording layer and a lubricant topcoat layer over the protective overcoat layer (both of which are not shown in the figure in order not to unnecessarily obscure the present invention).

Each of layers 3–5 and the protective overcoat layer may be formed utilizing at least one physical vapor deposition method selected from sputtering, vacuum evaporation, ion plating, ion beam deposition, and plasma deposition, or at least one chemical vapor deposition method selected from CVD, MOCVD, and PECVD; and the lubricant topcoat layer may be formed utilizing at least one method selected from dipping, spraying, and vapor deposition.

According to the present invention, the layer structures, thicknesses, and/or compositions of the non-magnetic interlayer 4 and the magnetic alloy-based, perpendicularly anisotropic, hard magnetic recording layer 5 are selected so as to act in concert to provide magnetic alloy-based, perpendicular recording medium 20 with the advantageous magnetic properties/characteristics normally associated only with multilayer magnetic superlattice-based perpendicular recording media, while avoiding the manufacturing difficulties inherent in the fabrication of the latter in a commercially viable manner. The advantageous characteristics attainable by the present invention are illustrated in the following example.

EXAMPLE

Figure 4:
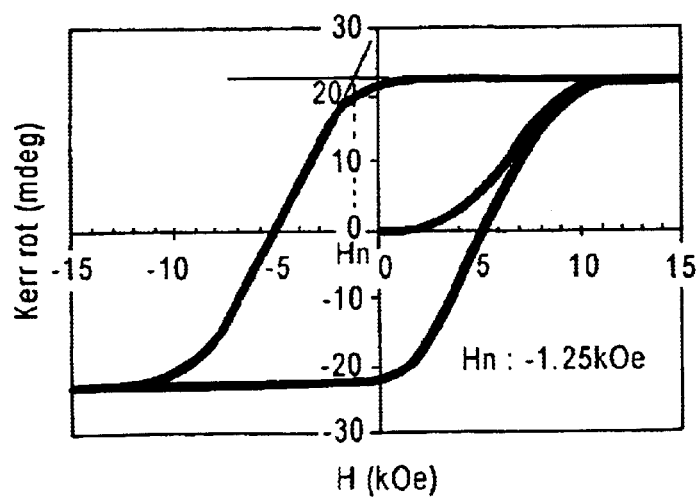
FIG. 4 is a polar Kerr loop of a CoCrPt alloy-based perpendicular recording medium according to the present invention.

A single-disk DC magnetron sputtering apparatus comprised of multi-vacuum chambers was utilized for fabricating magnetic alloy-based perpendicular recording media 20 according to the invention, in disk form and having a structure of disk substrate/FeCoB/Ru/CoCr/CoCrPt, corresponding to the layer structure 2/3/4/5 shown in FIG. 3. Each of the layers 2–5 was deposited by DC magnetron sputtering, with interlayer 4 and recording layer 5 being sputter-deposited in an Ar atmosphere at about 5 mTorr. For deposition of Ru/CoCr interlayer 4 of bi-layer structure, 0.1–0.7 kW DC power was applied to 7" targets of Ru and $CoCr_{40}$, respectively, with a target-to-disk substrate spacing of about 2". The deposition rate was 0.4–2.8 nm/sec. for the Ru sub-layer and 0.32–2.24 nm/sec. for the CoCr sub-layer. The disks were heated to 380–400° C. for about 8 sec. in an infra-red ("IR") heating station positioned between the Ru and CoCr sputtering chambers, and the thickness of the sub-layers of interlayer 4 was varied between 0 and 10 nm, while maintaining the combined thickness of the sub-layers at about 10 nm. FIG. 4 shows a polar Kerr hysteresis loop obtained for a perpendicular medium with a layer structure of: substrate/FeCoB (200 nm)/Ru (2.5 nm)/$CoCr_{40}$ (5 nm)/$CoCr_{20}Pt_{15}$ (24 nm), which medium exhibited a high coercivity of about 5,000 Oe, a remanent squareness of about 0.98, and a high negative nucleation field $H_n$ of about –1,250 Oe. (As for the latter value of $H_n$, even more negative values of $H_n$ in the range from about –1,500 to about –2,000 have been obtained in further experiments with other magnetic alloy compositions for the recording layer, e.g., $CoCr_{20}Pt_{15}$, $CoCr_{20}Pt_{17}$, and $CoCr_{20}Pt_{19}$ alloys).

Thus, the present invention advantageously provides improved, high areal recording density, low noise, magnetic alloy-based perpendicular magnetic data/information recording, storage, and retrieval media including an improved non-magnetic interlayer and interlayer/recording layer combination which provide advantageous magnetic performance parameters typically characteristic of magnetic multilayer superlattice-based perpendicular recording media, while avoiding the difficulties associated with commercial-scale manufacture of the latter. As a consequence, the inventive methodology effectively eliminates, or at least suppresses, the generation of noise associated with high bit density, perpendicular magnetic media utilizing magnetic alloy layers.

The media of the present invention are especially useful when employed in conjunction with single-pole recording/retrieval transducer heads and enjoy particular utility in high recording density media for computer-related applications. In addition, the inventive media can be readily fabricated by means of conventional methodologies, e.g., sputtering techniques.

In the previous description, numerous, specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A low noise, high areal recording density, perpendicular magnetic recording medium, comprising:
   (a) a non-magnetic substrate having a surface; and
   (b) a layer stack formed over said substrate surface, said layer stack comprising, in overlying sequence from said substrate surface:
   (i) a magnetically soft underlayer;
   (ii) at least one non-magnetic interlayer; and
   iii) a CoCr-based, magnetically hard perpendicular recording layer;
   wherein the compositions of said at least one non-magnetic interlayer and said CoCr-based, magnetically hard perpendicular recording layer are selected to provide said medium with a negative nucleation field $H_n$, remanent squareness of about 1, and high coercivity of at least about 5,000 Oe, wherein:
   said at least one non-magnetic interlayer (ii) comprises a layer of Ru, a Ru/CoCr bi-layer structure, or a Ru/CoCrX bi-layer structure, where X is at least one element selected from the group consisting of Pt, Ta, Mo, Ti, W, Ag, and Pd.

2. The magnetic recording medium as in claim 1, wherein: said at least one non-magnetic interlayer (ii) is not more than about 10 nm thick.

3. The magnetic recording medium as in claim 1, wherein: said at least one non-magnetic interlayer (ii) comprises a Ru/CoCr bi-layer structure, wherein the Cr content of the CoCr portion of said Ru/CoCr bi-layer structure is from about 37 to about 43 at. %.

4. The magnetic recording medium as in claim 1, wherein: said at least one non-magnetic interlayer (ii) comprises a Ru/CoCrX bi-layer structure, wherein the Co content of the CoCrX portion of said Ru/CoCrX bi-layer structure is from about 57 to about 63 at. %.

5. The magnetic recording medium as in claim 1, wherein: said CoCr-based, magnetically hard perpendicular recording layer (iii) is from about 10 to about 30 nm thick and comprises a CoCrPt alloy.

6. The magnetic recording medium as in claim 1, wherein: said magnetically soft underlayer (i) is from about 150 to 400 nm thick and comprises a material selected from the group consisting of: Ni, NiFe (Permalloy), Co, CoZr, CoZrCr, CoZrNb, CoTaZr, CoFe, Fe, FeN, FeSiAl, FeSiAlN, FeTaC, FeAlN, FeTaN, CoFeZr, and FeCoB.

7. The magnetic recording medium as in claim 6, wherein: said magnetically soft underlayer (i) comprises FeCoB.

8. The magnetic recording medium as in claim 1, wherein: said non-magnetic substrate (a) comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof.

9. The magnetic recording medium as in claim 1, further comprising:
   (c) a protective overcoat layer over said magnetically hard perpendicular recording layer (iii); and
   (d) a lubricant topcoat over said protective overcoat layer.

10. The magnetic recording medium as in claim 1, wherein:
   aid non-magnetic substrate (a) comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof; and said layer stack (b) comprises:
   a magnetically soft underlayer (i) from about 150 to 400 nm thick and comprised of FeCoB;
   a non-magnetic interlayer (ii) not greater than about 10 Å thick; and a magnetically hard, perpendicular magnetic recording layer (iii) about 25 nm thick and comprised of a CoCrPt alloy with about 20 at. % Cr and about 15 at. % Pt; wherein said medium exhibits a high coercivity of about 5,000 Oe, a remanent squareness of about 0.98, and a negative nucleation field $H_n$ of at least about −1,250 Oe.

11. A low noise, high areal recording density, perpendicular magnetic recording medium, comprising:

(a) a non-magnetic substrate having a surface; and (b) a layer stack formed over said substrate surface, said layer stack comprising, in overlying sequence from said substrate surface:

(i) a magnetically soft underlayer;

(ii) at least one non-magnetic interlayer; and (iii) a CoCr-based, magnetically hard perpendicular recording layer;

wherein the compositions of said at least one non-magnetic interlayer and said CoCr-based, magnetically hard perpendicular recording layer are selected to provide said medium with a negative nucleation field $H_n$, remanent squareness of about 1, and high coercivity of at least about 5,000 Oe, wherein:

said CoCr-based, magnetically hard perpendicular recording layer (iii) is from 10 to about 30 nm thick and comprises a CoCrPt alloy with a Pt content from about 14 to about 21 at. %.

12. The magnetic recording medium as in claim 11, wherein:

said CoCrPt alloy comprises about 20 at. % Cr and about 15 at. % Pt.

13. A method of manufacturing a low noise, high areal recording density, perpendicular magnetic recording medium, comprising the steps of:

(a) providing a non-magnetic substrate having a surface; and (b) forming a layer stack over said substrate surface, comprising steps for forming in overlying sequence from said substrate surface:

(i) a magnetically soft underlayer;

(ii) at least one non-magnetic interlayer; and iii) a CoCr-based, magnetically hard perpendicular recording layer;

wherein step (b) includes selecting the compositions of said at least one non-magnetic interlayer and said CoCr-based, magnetically hard perpendicular recording layer to provide said medium with a negative nucleation field $H_n$, remanent squareness of about 1, and high coercivity of at least about 5,000 Oe, wherein step (b)(ii) comprises forming said at least one non-magnetic interlayer at a thickness not greater than about 10 nm and comprised of a layer of Ru, a Ru/CoCr bi-layer structure, or a Ru/CoCrX bi-layer structure, wherein X is at least one element selected from the group consisting of Pt, Ta, Mo, Ti, W, Ag, and Pd.

14. The method according to claim 13, wherein:

step (a) comprises providing a non-magnetic substrate comprised of a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof;

step (b)(i) comprises forming said magnetically soft underlayer as an about 150 to about 400 nm thick layer comprised of a material selected from the group consisting of: Ni, NiFe (Permalloy), Co, CoZr, CoZrCr, CoZrNb, CoTaZr, CoFe, Fe, FeN, FeSiAl, FeSiAlN, FeTaC, FeAlN, CoFeZr, and FeCoB;

step (b)(ii) comprises forming said at least one non-magnetic interlayer at a thickness not greater than about 10 nm; and step (b)(iii) comprises forming said CoCr-based, magnetically hard perpendicular recording layer as an about 10 to about 30 nm thick layer comprised of a CoCrPt alloy with a Pt content from about 14 to about 21 at. %.

15. The method according to claim 14, wherein:

step (b)(i) comprises forming a magnetically soft underlayer comprised of FeCoB;

step (b)(ii) comprises forming a non-magnetic interlayer wherein the portion of Co in the Ru/CoCr bi-layer structure or Ru/CoCrX bi-layer structure is from about 57 to about 63 at. %; and step (b)(iii) comprises forming a magnetically hard, perpendicular magnetic recording layer (iii) about 25 nm thick and comprised of a CoCrPt alloy with about 20 at. % Cr and about 15 at. % Pt;

whereby said medium exhibits a high coercivity of about 5,000 Oe, a remanent squareness of about 0.98, and a negative nucleation field $H_n$ of at least about −1,250 Oe.

16. The method according to claim 13, wherein:

each of steps (b)(i), (b)(ii), and (b)(iii) for respectively forming said magnetically soft underlayer, said non-magnetic interlayer, and said magnetically hard, perpendicular recording layer comprises DC magnetron sputtering; and the method further comprises heating said non-magnetic substrate between steps (b)(i) and (b)(ii) and between steps (b)(ii) and (b)(iii).

17. The method according to claim 13, further comprising steps of:

(c) forming a protective overcoat layer over said magnetically hard perpendicular recording layer; and (d) forming a lubricant topcoat over said protective overcoat layer.

* * * * *